United States Patent [19]

Tomalia et al.

[11] 3,928,499
[45] Dec. 23, 1975

[54] UNSATURATED POLY(AMIDE-ESTERS) AND CROSS-LINKED DERIVATIVES THEREOF

[75] Inventors: Donald A. Tomalia; Bruce P. Thill, both of Midland, Mich.

[73] Assignee: The Dow Chemical Company, Midland, Mich.

[22] Filed: Feb. 19, 1974

[21] Appl. No.: 443,265

[52] U.S. Cl. ............ 260/885; 117/161; 204/159.16; 204/159.22; 260/882; 260/886; 260/80.3 R; 260/82.1; 260/85.5 ES; 260/85.5 AM; 260/85.5 B; 260/86.1 N; 260/88.1 PN; 260/88.1 PA; 260/89.5
[51] Int. Cl.² ................. C08L 31/02; C08L 25/00; C08F 210/00; C08F 218/00
[58] Field of Search...... 260/86.1 N, 89.5 N, 486 R, 260/885, 886, 80.3 R, 85.5 B, 85.5 ES, 85.5 AM

[56] References Cited
UNITED STATES PATENTS

| | | | |
|---|---|---|---|
| 2,458,422 | 1/1949 | Reynolds et al. | 260/486 R |
| 3,531,525 | 9/1970 | Hoke et al. | 260/86.1 N |

*Primary Examiner*—Joseph L. Schofer
*Assistant Examiner*—Herbert J. Lilling
*Attorney, Agent, or Firm*—L. Wayne White

[57] ABSTRACT

The compounds disclosed herein are substantially linear, toluene-soluble vinyl addition polymers whose backbones comprise a plurality of units corresponding to the formula

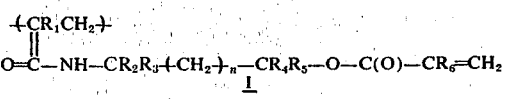

wherein $R_1$ is hydrogen or methyl; $R_2$–$R_5$ are hydrogen or lower alkyl; $R_6$ is hydrogen or methyl; and n is 0 or 1. The polymers may be cast as coatings and be cross-linked by conventional techniques. Additionally, the polymers can be dissolved in a reactive monomer diluent, such as methyl methacrylate, and this curable mixture used to form coatings or shaped articles. The polymers are prepared by reacting a vinyl addition prepolymer having pendant oxazoline or 5,6-dihydro-4H-1,3-oxazine groups with acrylic or methacrylic acid.

15 Claims, No Drawings

UNSATURATED POLY(AMIDE-ESTERS) AND CROSS-LINKED DERIVATIVES THEREOF

BACKGROUND OF THE INVENTION

1. Field of the Invention

This invention pertains to novel poly(amide-esters) and cross-linked derivatives thereof. They are conveniently prepared by reacting vinyl addition prepolymers bearing a plurality of pendant oxazoline or 5,6-dihydro-4H-1,3-oxazine groups with acrylic or methacrylic acid.

2. Prior Art

Dowbenko (U.S. Pat. No. 3,609,161) prepared polymerizable unsaturated oxazoline compounds by dehydrating a hydroxyalkyl substituted aminoethanol and esterifying or transesterifying the resulting alcohol with an ethylenically unsaturated monocarboxylic acid or an ester of such an acid (such as acrylic acid or methyl methacrylate). He prepared what he termed thermosetting acrylics by interpolymerizing such unsaturated oxazoline compounds with other ethylenic monomers to first form a prepolymer and subsequently cross-linking the prepolymer by heating or by reacting the prepolymer with a dicarboxylic acid.

Netherland patent 7,303,459 describes polymers prepared by subjecting an $\alpha,\omega$-hydrocarbylene bisoxazoline bearing acryolyloxy or methacryolyloxy hydrocarbylene substituents on each oxazoline ring to radiation. Polymers thus formed are cross-linked polymers bearing the oxazoline groups intact.

Arlt et al. (U.S. Pat. No. 3,752,793) describes powder coating compositions which are cross-linked polymers formed by reacting certain copolymers having a plurality of pendant carboxy groups with bis- or tris-oxazolines. The copolymers were comprised of, in interpolymerized form, styrene or certain styrene derivatives and acrylic or methacrylic esters and $\alpha,\beta$-unsaturated carboxylic acids. Such powder coating compositions were cross-linked in each instance.

Kagiya et al. (Journal of Polymer Letters, Volume 4, 257–260 (1966)) formed substantially linear polymers by reacting alkylene or arylene bisoxazolines with an alkylene dicarboxylic acid.

None of the polymers described above are believed to offer the versatility and/or desirable physical properties of the novel polymers hereafter described.

SUMMARY OF THE INVENTION

We have discovered a novel class of polymers hereafter referred to as unsaturated poly(amide-esters). This class of polymers consists of vinyl addition polymers whose backbones comprise a plurality of units corresponding to the formula

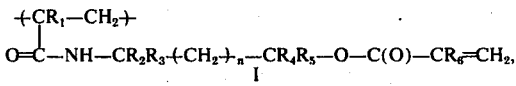

wherein $R_1$ is hydrogen or methyl; $R_2$, $R_3$, $R_4$ and $R_5$ are each independently hydrogen or lower alkyl of 1 to 4 carbon atoms; $R_6$ is hydrogen or methyl; and $n$ is 0 or 1 and is preferably 0. The unsaturated poly(amide-esters) are substantially linear polymers (i.e., not cross-linked) which can be easily cross-linked through the terminal acrylate or methacrylate groups by conventional free radical mechanisms, by actinic light (e.g., ultraviolet light) or by ionizing radiation (e.g., electron-beam, $\gamma$-radiation, etc.).

Such linear polymers are distinct from the prior art materials cited above in that the instant polymers are linear, film-forming, soluble polymers bearing pendant ester-amide groups having terminal polymerizable acrylate or methacrylate moieties.

In a preferred aspect of the invention, the backbone of the instant polymers is composed of at least about 1 mole percent of units corresponding to formula I above. Most preferred are the instant polymers whose backbones are composed of from about 5 to about 50 mole percent of units corresponding to formula I.

The instant unsaturated poly(amide-esters) polymers are soluble in conventional solvents, such as benzene, toluene, methyl ethyl ketone, acetone, etc. More significantly, however, they are also soluble in liquid reactive monomer diluents. Such reactive monomer diluents are polymerizable vinyl monomers, such as vinylaromatic monomers, lower alkyl acrylates and methacrylates, hydroxyalkyl acrylates and methacrylates, acrylonitrile, methacrylonitrile and the like. The combination or mixture of the subject polymers with such reactive monomer diluents forms novel curable compositions which are uniquely useful in forming coatings or shaped articles (e.g., castings and laminates) which can be cross-linked by conventional techniques. The advantages of such combinations are the absence of polluting fumes during the cure cycle and the absence of solvent impurities in the cross-linked products.

The cross-linked coatings formed from the instant unsaturated poly(amide-esters) or from the blends thereof with reactive monomer diluents exhibit excellent strength, durability, weatherability, solvent resistance and adhesion to the coated substrate (particularly ferrous substrates). Our coating compositions are superior to the cited prior art materials in one or more of these aspects.

DETAILED DESCRIPTION OF THE INVENTION

The Prepolymers

The instant unsaturated poly(amide-esters) are conveniently prepared by reacting acrylic or methacrylic acid with a vinyl addition prepolymer bearing a plurality of pendant oxazoline groups. Said prepolymers are thus homopolymers of a 2-vinyl- or 2-isopropenyl-2-oxazoline or a homopolymer of a 2-vinyl- or 2-isopropenyl-5,6-dihydro-4H-1,3-oxazine or they are interpolymers of such oxazolines and oxazines with other ethylenically unsaturated compounds interpolymerizable therewith. Suitable prepolymers for use herein contain from about 5 to 100 weight percent of a 2-vinyl and/or 2-isopropenyl-2-oxazoline and/or a 2-vinyl- and/or 2-isopropenyl-5,6-dihydro-4H-1,3-oxazine in interpolymerized form and the preferred prepolymers contain from about 5 to about 50 weight percent of said oxazoline or oxazine monomers. The number average molecular weight ($\overline{M}_n$) of the prepolymers normally ranges from about 1,000 to about 20,000 but is preferably in the range of from about 1,000 to about 10,000.

The polymers of 2-vinyl- or 2-isopropenyl-2-oxazolines and 2-vinyl- or 2-isopropenyl-5,6-dihydro-4H-1,3-oxazines constitute a well known class of compounds, as illustrated by the following U.S. Pat. Nos.

| | |
|---|---|
| 2,831,858 | 3,248,397 |
| 2,897,182 | 3,493,635 |
| 2,968,657 | 3,505,297 |

| 2,974,140 | -continued | 3,509,235 | and by German Pat. No. 1,067,437 and by French Pat. Nos. 1,367,518 and 1,385,727. Suitable such prepolymers therefore include the homopolymer of 2-vinyl-2-oxazoline, the homopolymer of 2-isopropenyl-2-oxazoline, the interpolymers of 2-isopropenyl-2-oxazoline with vinyl aromatic monomers (such as styrene, vinyl naphthalene, etc.) ar-alkyl styrenes (such as vinyltoluene, p-t-butylstyrene, etc.) ar-chlorinated styrenes (o- or p-chlorostyrene, etc.), α-methyl styrene, vinylnaphthalene, and the like; alkyl acrylates and methacrylates (such as methyl, ethyl, propyl, butyl and hexyl acrylate and methacrylate, and the like); β-hydroxyalkyl acrylates and methacrylates (such as 2-hydroxyethyl-, 2-hydroxypropyl- and 2-hydroxybutyl acrylate and methacrylate, and the like); α,β-ethylenically unsaturated nitriles (such as acrylonitrile, methacrylonitrile, and the like); α,β-ethylenically unsaturated carboxamides (such as acrylamide, methacrylamide, N,N-dimethylacrylamide, and the like); vinyl esters (such as vinyl acetate, vinyl propionate, vinyl benzoate, and the like), and other like compounds, and the corresponding interpolymers wherein 2-isopropenyl-2-oxazoline is replaced with 2-vinyl-2-oxazoline, 2-vinyl-4,4-dimethyl-2-oxazoline, 2-isopropenyl-4,4-diethyl-2-oxazoline, 2-vinyl-5,6-dihydro-4H- 1,3-oxazine, 2-isopropenyl-5,6-dihydro-4H-1,3-oxazine, and other like compounds.

Polymerization of the oxazoline and oxazine monomers (and optionally the vinyl comonomers as set forth above) may be effected in bulk, solution, emulsion, or in suspension under conventional operating parameters for free radical polymerizations. Conventional free radical catalyst can be used, such as azo-bis-isobutyronitrile (AIBN), etc. Normally, temperatures of polymerization will range from 0° to about 100°C with a range of from 40° to about 80°C being preferred.

Preparation of the Instant Unsaturated Poly(amide-esters)

Acrylic or methacrylic acid is reacted with the prepolymer in amounts such that substantial numbers or all of the pendant oxazoline or oxazine groups are converted to the amide-ester groups as defined by I above. The stoichiometry of the reaction requires one mole of acrylic or methacrylic acid per pendant oxazoline or oxazine group. We normally prefer to use a slight excess of the acrylic or methacrylic acid reactant to insure conversion of substantially all of the pendant oxazoline or oxazine groups to the amide-ester group of formula I. The reaction is conducted by merely blending the acrylic or methacrylic acid with the prepolymer and warming the mixture to a temperature sufficient to cause reaction (as evidenced by a temperature exotherm). Suitable reaction rates have been achieved at temperatures in the range of from about 75° to about 100°C but higher or lower temperatures may be used if desired. The presence of a small but inhibiting amount of a conventional free radical inhibitor, such as t-butyl catechol, is advantageous in this heating step. The reaction between the acrylic or methacrylic acid and the prepolymer may be conducted by blending the reactants neat or in the presence of a conventional inert solvent such as benzene, toluene, etc., but is preferably conducted in the presence of a reactive monomer diluent. In the latter instance, the novel unsaturated poly(amide-esters) are dissolved in the reactive monomer diluent as they are formed and the curable reaction mixture thus obtained can be used "as is" in the coating application or in forming shaped articles.

By the term "reactive monomer diluent" is meant the known class of vinyl monomers which are copolymerizable with the lower alkyl (i.e., $C_1-C_4$) acrylates and methacrylates. Suitable such reactive diluent monomers therefore include vinyl aromatic monomers (such as styrene, vinylnaphthalene, and the like), ar-alkyl styrenes (such as vinyltoluene, p-t-butylstyrene, and the like) ar-chlorinated styrenes (such as o and p-chlorostyrene and the like), α-methyl styrene; alkyl acrylates and methacrylates (such as methyl, ethyl, propyl, butyl and hexyl acrylates and methacrylates, and the like); β-hydroxyalkyl acrylates and methacrylates (such as 2-hydroxyethyl-, 2-hydroxypropyl- and 2-hydroxybutyl acrylate and methacrylate, and the like); α,β-ethylenically unsaturated nitriles (such as acrylonitrile, methacrylonitrile, and the like); α,β-ethylenically unsaturated carboxamides (such as acrylamide, methacrylamide, N,N-dimethyl acrylamide, and the like); vinyl esters (such as vinyl acetate, vinyl propionate, vinyl benzoate, and the like), and other like compounds. The reactive diluent monomer may comprise from about 20 to about 80 weight percent of the final solution but preferably is used in the range of from about 30 to about 70 weight percent of the final solution. This solution of the poly(amide-esters) in the reactive diluent monomer may likewise be applied neat or in solution with an inert solvent to an article to be protected and this coating can likewise be cured by conventional technique. Conventional radiation techniques for curing the vinyl monomers is the preferred technique. The alkyl and β-hydroxyalkyl acrylates and methacrylates having from 1 to 4 carbon atoms in the alkyl or β-hydroxyalkyl substituent are the preferred reactive diluent monomers. The most preferred reactive diluent monomers are the methyl and ethyl acrylates and methacrylates and the 2-hydroxyethyl-, 2-hydroxypropyl and 2-hydroxybutyl acrylates and methacrylates.

Utility of the Poly(amide-esters)

The novel unsaturated poly(amide-esters) are solids or viscous liquids. They are used to coat various articles by applying said poly(amide-esters) or a solution thereof to the article to be coated and subsequently cross-linking the polymers by a conventional free radical process or by use of ionizing radiation (such as a high energy electron beam) or by exposure to an ultraviolet light source.

The cured coating compositions are clear, durable, thermosetting resinous materials having excellent solvent resistance, excellent weather resistance and a hardness of from 2H to 6H pencil hardness.

Experimental: Preparation of the Prepolymer — General Procedure

The 2-vinyl or 2-isopropenyl-2-oxazoline or oxazine monomer was charged along with a vinyl copolymer to a pressure vessel. To this mixture was added a free radical initiator (azo-bis-isobutyronitrile (AIBN)) and a chain transfer agent (either bromoform or dodecanethiol). The pressure vessel was then purged with nitrogen, closed and the contents maintained with agitation at 70°C for 16 hours. The prepolymers thus formed were clear viscous liquids or solids, and, if solid, were ground in a laboratory grinder prior to reaction with acrylic or methacrylic acid. The prepolymers were soluble in both toluene and methyl ethyl ketone. This series of runs is detailed in Table I.

The listing of "parts" of each component in forming the prepolymers in Table I and all subsequent reference to "parts" means part-by-weight.

polymer film on the salt plate was a clear friable film after the styrene monomer/solvent was evaporated.

In an analogous manner, other unsaturated poly(a-mide-esters) were prepared by reacting the above prepolymers with either acrylic or methacrylic acid; said acid was used in amounts of from 1 to 1.1 equivalents thereof per pendant oxazoline or oxazine group in the prepolymer. In each run, the resulting poly(amide-ester) was obtained as a solution in the reactive monomer diluent. This series of runs is summarized in Table II.

TABLE II

| Run No. | Prepolymer from Run No. | Reactive Monomer Diluent (parts) | % Polymer Solids | Acid | p-t-Butyl Catechol Inhibitor (ppm) | Time/ Temp. |
|---|---|---|---|---|---|---|
| 14 | 3 | MMA | 30 | MAA | 900 | 8 hr/90°C |
| 15 | 4 | 60/40 EA/MMA | 50 | MAA | 50 | 16 hr/90°C |
| 16 | 5 | 60/40 EA/MMA | 50 | MAA | 50 | 16 hr/90°C |
| 17 | 6 | 60/40 EA/MMA | 50 | MAA | 50 | 16 60/40 EA/MMA |
| 18 | 7 | 60/40 EA/MMA | 20 | MAA | 50 | 16 hr/90°C |
| 19 | 8 | MMA | 50 | MAA | 50 | 16 hr/90°C |
| 20 | 9 | 56/44 EA/MAA | 50 | MAA | 50 | 17.5 hr/90°C |
| 21 | 10 | MMA | 30 | MAA | 195 | 16 hr/90°C |
| 22 | 11 | 56/44 EA/MMA | 44 | MAA | 50 | 16 hr/90°C |
| 23 | 11 | 56/44 EA/MMA | 44 | AA | 50/1.5BQ | 16 hr/90°C |
| 24 | 12 | MMA | 50 | MAA | 100 | 8 hr/90°C |
| 25 | 13 | STYRENE | 30 | MAA | 900 | 8 hr/90°C |

"MAA" is methacrylic acid
"AA" is acrylic acid
"BQ" is benzoquinone

TABLE I

| Run No. | Oxazoline or Oxazine Monomer (parts) | Comonomer (parts) | Chain-Transfer Agent (parts) | AIBN (parts) |
|---|---|---|---|---|
| 1 | 2-IPO (10) | Styrene (90) | B (5) | 0.2 |
| 2 | 2-IPO (25) | Styrene (75) | B (10) | 0.5 |
| 3 | 2-IPO (5) | MMA (95) | B (10) | 0.2 |
| 4 | 4,4-Dimethyl-2-IPO (10) | MMA (90) | D (2) | 0.5 |
| 5 | 4-Methyl-2-VO (10) | MMA (90) | D (2) | 0.5 |
| 6 | 5-Methyl-2-VO (10) | MMA (90) | D (2) | 0.5 |
| 7 | 2-Vinyl-5,6-Dihydro-4H-1,3-OXazine (10) | MMA (90) | D (2) | 0.5 |
| 8 | 4-Methyl-4-Propionoxymethyl-2-IPO (20) | MMA (80) | D (2) | 0.5 |
| 9 | 2-IPO (10) | MMA (45) EA (45) | D (2) | 0.5 |
| 10 | 2-IPO (10) | MMA (90) | D (2) | 0.5 |
| 11 | 2-IPO (20) | MMA (30) EA (50) | D (2) | 0.5 |
| 12 | 2-IPO (20) | MMA (80) | D (4) | 0.5 |
| 13 | 2-VO (10) | Styrene (90) | B (10) | 0.5 |

"2-IPO" is 2-isopropenyl-2-oxazoline
"2-VO" is 2-vinyl-2-oxazoline
"MMA" is methyl methacrylate
"EA" is ethyl acrylate
"B" is bromoform ($CHBr_3$)
"D" is dodecanethiol Preparation of the Instant Unsaturated Poly(amide-esters)

The prepolymer from Run 1 (9 g.) containing 0.0077 base moles of oxazoline residues was dissolved at room temperature in styrene (21 g.) containing t-butyl catechol inhibitor (0.01 g.). Glacial methacrylic acid (0.75 g., 0.0087 moles) was charged to the prepolymer and the reaction mixture heated at 90°C for 8 hours. A film of this polymer was cast on a salt plate and the styrene monomer/solvent removed by evaporation under reduced pressure. The resulting film was then examined by infrared (IR) spectroscopy. Bands at 3300 and 1640 cm$^{-1}$ confirm the presence of secondary amide groups while the presence of an $\alpha,\beta$-unsaturated ester group was established by bands at 1715 and 1610 cm.$^{-1}$. The Preparation of Cross-Linked Poly(amide-esters) — Free Radical An aliquot of the reaction product from Run 4 above (2.0 g.) was combined with AIBN (0.02 g.) and the solution purged with nitrogen for 10 minutes. The reaction vessel was then sealed and the solution heated at 70°C for 16 hours. The resulting product was a hard, slightly hazy straw-colored solid which was insoluble but slightly swelled in toluene.

The prepolymer from Run 2 was dissolved in sufficient methyl methacrylate to give a 30 weight percent solution of the polymer in the methyl methacrylate. A 9 gram aliquot of this mixture contains 0.0067 base moles of oxazoline. This 9 gram aliquot was blended with methacrylic acid (0.86 g.; 0.01 moles) and t-butyl catechol (0.02 g.). This homogeneous solution was sealed in a pressure vessel and heated at 90°C for 8 hours to give the poly(amide-ester) as a moderately viscous straw-colored liquid dissolved in the methyl methacrylate. Two grams of this solution were combined with 0.02 g. of AIBN, the sample purged with nitrogen, and the vessel sealed under reduced nitrogen pressure and heated at 70°C for 16 hours. The resultant transparent straw-colored interpolymer was flexible and strong. It was insoluble in benzene and methyl ethyl ketone but swelled in methylene chloride.

In the series of runs summarized in Table III below, several of the solutions of unsaturated poly(amide-esters) in various liquid vinyl monomers from Table II were combined with one weight percent of benzoyl peroxide, and the reaction mixture heated at 82°C for 16 hours followed by warming at 120°C for 0.5 hours. In all instances a clear, cross-linked interpolymer was obtained which was insoluble in but swelled by methylene chloride.

TABLE III

Benzoyl Peroxide Initiated Cured Poly(amide-ester) Resins

| Run No. | Curable Mixture from Run No. | Gel Time (minutes) | Peak Exotherm (°C) |
|---|---|---|---|
| 26 | 15 | 6.05 | 129 |
| 27 | 16 | 6.95 | 149 |
| 28 | 17 | 7.00 | 131 |
| 29 | 18 | 6.90 | 143 |
| 30 | 19 | 9.60 | 128 |
| 31 | 20 | 5.60 | 174 |
| 32 | 23 | 5.90 | 178 |

In each instance the reactions were exothermic and the peak of the exotherm and the gel times of the reaction mixtures were recorded. In Runs 26–29, the cross-linked interpolymerized products were clear flexible and very tough. In Run 30 the cross-linked product was clear, hard and very tough having a glassy appearance. In Runs 31 and 32 the cross-linked interpolymerized products were clear, flexible materials.

Preparation of Cross-Linked Poly(amide-esters) — Ionizing Radiation

In another series of runs, several of the solutions of unsaturated poly(amide-esters) in various liquid vinyl monomers from Table II were coated to 1 mil thickness on bonderized field test panels and subjected to a 2 million electron volt electron beam at various total dosages. The results of this series of runs are summarized in Table IV below.

TABLE IV

| Run No. | Curable Mixture from Run No. | Reactive* Monomer Diluent Added | Unsaturated Poly(amide-ester) in Solution (%) | Radiation Dosage (Mrad) | Pencil Hardness | Tape Test (%) |
|---|---|---|---|---|---|---|
| 33 | 20 | None | 50 | 1 | 6H | 87 |
| 34 | 20 | None | 50 | 2 | 6H | 75 |
| 35 | 24 | None | 50 | 1 | >6H | Not Measured |
| 36 | 24 | None | 50 | 2 | >6H | 100 |
| 37 | 24 | BA | 40 | 2 | 2-3H | 69 |
| 38 | 24 | HPA | 40 | 1 | 2H | 100 |
| 39 | 24 | HPA | 40 | 3 | 3H | 100 |

*"BA" is butyl acrylate
"HPA" is 2-hydroxypropyl acrylate

In Runs 37–39, the curable reaction mixture of poly(amide-ester) dissolved in methyl methacrylate (from Run 24) was further blended with either butyl acrylate or 2-hydroxypropyl acrylate to form other curable compositions. These new compositions had a concentration of 40 weight percent, total weight basis, of unsaturated poly(amide-ester) in the combination of reactive monomer diluents. The cured coatings were very hard and insoluble in water and methyl ethyl ketone. Additionally, the cured coating adhered strongly to the substrate — as evidenced by the "Tape Test". In this test, the coating was scored in a cross hatch fashion forming squares 1/16 inch on a side and "Scotch" brand "Magic Tape" was pressed firmly to the scored surface and ripped at a 90° angle away from the test panel. The percent of the coating remaining on the test panel is given above.

The above examples are merely representative and other polyester (amide-esters) within the above description can be prepared and similarly used as coating compositions. Likewise, other liquid vinyl monomers could be used in dissolving the unsaturated poly(ester-amides) and the mixture of such materials applied as coatings and cured by free radical mechanisms, by ionizing radiation or by ultraviolet light.

We claim:
1. A substantially linear, film-forming, vinyl-addition polymer whose backbone comprises
   a. at least about 1 mole percent of an interpolymerized unit corresponding to the formula

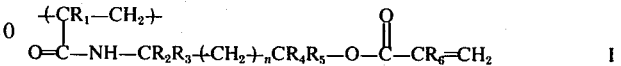

I wherein:
   $R_1$ is hydrogen or methyl; $R_2$, $R_3$, $R_4$ and $R_5$ are each independently hydrogen or lower alkyl of 1 to 4 carbon atoms; $R_6$ is hydrogen or methyl; and $n$ is 0 or 1, and
   b. from 0 to about 99 mole percent of an interpolymerized unit corresponding to the formula

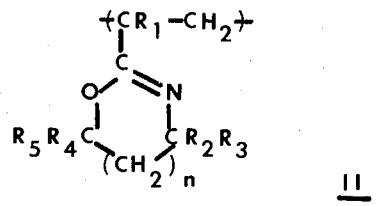

II wherein:
   $R_1$–$R_5$ and $n$ have the aforesaid meaning, with the proviso that units of formulas I and II constitute at least about 5 mole percent of said polymer.

2. The polymer defined by claim 1 wherein $n$ is 0.
3. The polymer defined by claim 1 wherein $R_1$ is methyl.
4. The polymer defined by claim 1 wherein $R_2$ and $R_3$ are each hydrogen.
5. The polymer defined by claim 4 wherein $n$ is 0 and $R_1$ is methyl.
6. The polymer defined by claim 1 wherein the polymer is additionally composed of at least one monomer, in polymerized form, selected from the group consisting of: a vinyl aromatic monomer, a conjugated diolefin, an alkyl- or hydroxyalkyl ester of an $\alpha,\beta$-ethylenically unsaturated carboxylic acid, an $\alpha,\beta$-ethylenically unsaturated carboxamide and an $\alpha,\beta$-ethylenically unsaturated nitrile.
7. The polymer defined by claim 6 wherein the polymer is composed of, in polymerized form, styrene, butadiene, isoprene, lower alkyl acrylate or methacrylate, lower hydroxyalkyl acrylate or methacrylate, or acrylonitrile.

8. A curable composition consisting essentially of
   a. from 20 to 80 weight percent of the polymer defined by claim 1, and
   b. from 80 to 20 weight percent of a reactive monomer diluent; said weight percentage being based on the combined weight of (a) and (b).

9. The composition defined by claim 8 consisting essentially of
   a. from 70 to 30 weight percent of the polymer defined by claim 1 and
   b. from 30 to 70 weight percent of a reactive monomer diluent.

10. The composition defined by claim 9 wherein (b) is styrene, lower alkyl acrylate or methacrylate, or lower hydroxy-alkyl acrylate or methacrylate.

11. An article coated with the composition defined by claim 8.

12. The composition defined by claim 8 which has been cured to form a cross-linked vinyl addition interpolymer.

13. The coated article defined by claim 11 wherein the coating composition has been cured to form a cross-linked vinyl addition interpolymer.

14. In the process of coating an article with a protective polymeric coating comprising the steps of coating said article with polymerizable composition and thereafter curing said composition on the surface of said article, the improvement consisting of using the composition defined by claim 8 as the polymerizable composition.

15. The polymer defined by claim 1 wherein from about 5 to about 50 mole percent of the polymer is composed of units of formula I.

* * * * *